United States Patent
Asaad et al.

(10) Patent No.: US 9,336,056 B2
(45) Date of Patent: May 10, 2016

(54) EXTENDIBLE INPUT/OUTPUT DATA MECHANISM FOR ACCELERATORS

(71) Applicant: International Business Machines Corporation, Armonk, NY (US)

(72) Inventors: Sameh W. Asaad, Briarcliff Manor, NY (US); Parijat Dube, Yorktown Heights, NY (US); Hong Min, Poughkeepsie, NY (US); Donald W. Schmidt, Stone Ridge, NY (US); Bharat Sukhwani, Briarcliff Manor, NY (US); Mathew S. Thoennes, West Harrison, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 353 days.

(21) Appl. No.: 14/144,794

(22) Filed: Dec. 31, 2013

(65) Prior Publication Data

US 2015/0186268 A1 Jul. 2, 2015

(51) Int. Cl.
| | |
|---|---|
| *G06F 12/00* | (2006.01) |
| *G06F 13/00* | (2006.01) |
| *G06F 13/28* | (2006.01) |
| *G06F 9/26* | (2006.01) |
| *G06F 9/34* | (2006.01) |
| *G06F 9/50* | (2006.01) |
| *G06F 9/54* | (2006.01) |
| *G06F 12/08* | (2016.01) |

(52) U.S. Cl.
CPC ............. *G06F 9/5016* (2013.01); *G06F 9/544* (2013.01); *G06F 12/084* (2013.01); *G06F 12/0835* (2013.01); *G06F 12/0855* (2013.01)

(58) Field of Classification Search
CPC ..... G06F 9/5016; G06F 9/544; G06F 12/084; G06F 12/0835; G06F 12/0855
USPC ................... 711/147, 169, 202, 208
See application file for complete search history.

(56) References Cited

U.S. PATENT DOCUMENTS

| | | | |
|---|---|---|---|
| 2008/0189252 A1 | 8/2008 | Branscome et al. | |
| 2012/0188263 A1* | 7/2012 | Becchi | G06F 12/0284 345/543 |
| 2012/0281003 A1 | 11/2012 | Ortiz et al. | |

* cited by examiner

*Primary Examiner* — Tuan Thai
*Assistant Examiner* — Shane Woolwine
(74) *Attorney, Agent, or Firm* — Cantor Colburn LLP; Mercedes Hobson

(57) ABSTRACT

Embodiments include methods, systems and computer program products for providing an extendable job structure for executing instructions on an accelerator. The method includes creating a number of data descriptor blocks, each having a fixed number of memory location addresses and a pointer to a next of the number of the data descriptor block. The method further includes creating a last data descriptor block having the fixed number of memory location addresses and a last block indicator. Based on determining that additional memory is required for executing instructions on the accelerator, the method includes modifying the last data descriptor block to become a data extender block having a pointer to one of one or more new data descriptor blocks and creating a new last data descriptor block.

20 Claims, 9 Drawing Sheets

EXTENDIBLE INPUT/OUTPUT DATA MECHANISM FOR ACCELERATORS

BACKGROUND

The present invention relates to data processing by accelerators, and more specifically, to a system of extendible input/output data mechanisms for use by an accelerator.

In general, a central processing unit (CPU), or host, offloads specific processing tasks to accelerators to reduce the workload on the CPU. The use of accelerators, such as field programmable gate arrays (FPGAs) and graphics processing units (GPUs), to process specific tasks is becoming more wide spread.

Currently, an interface between the host and an accelerator is implemented as a queue on the host, which queues jobs for the accelerator to be worked on asynchronously. A control structure is typically used by the host to convey the job information such as what operations are to be executed by the accelerator, locations of the input data in memory and locations in memory to write the output data. These data location values are traditionally static for the life of the job, which is from the creation of the control block in the queue until the job is complete. The static nature of the data location values limits the job to a fixed amount of input/output data which must be determined before the creation of the control structure.

In many cases, the specification of the entire input/output areas in host memory before the creation of the control structure may require locking a large amount of data/memory space for the entire duration of the job including time spent queued for the accelerator. In addition, since the amount of data output may not be known at the time of creation of the control structure, a worst case estimate is commonly used to reserve adequate space for the output data.

SUMMARY

Embodiments include methods, systems and computer program products for providing an extendable job structure for executing instructions on an accelerator. The method includes creating, with a processing device, a number of data descriptor blocks, wherein each of the number of data descriptor blocks comprises a fixed number of memory location addresses for data associated with each of the number of data descriptor blocks and a pointer to a next of the number of the data descriptor block. The method also includes creating a last data descriptor block comprising the fixed number of memory location addresses for data associated with last data descriptor block and an last block indicator, wherein one of the pointers to the next of the number of the data descriptor blocks points to the last data descriptor block. Based on determining that additional memory is required for executing instructions on the accelerator, the method includes modifying the last data descriptor block to become a data extender block comprising a pointer to one of one or more new data descriptor blocks, each of the one or more new data descriptor blocks comprises the fixed number of memory location addresses for data and creating a new last data descriptor block comprising the fixed number of memory locations for data associated with the new last data descriptor block and the last block indicator.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein include a system having an extendible input/output data mechanism for processing a job on an accelerator. The extendible input/output data mechanism is configured to allow the extension of the input and output areas used by a job while the job runs. In exemplary embodiments, an application can specify the input and output at the time of job creation and can also add more input data for the accelerator or extend the output area if the accelerator is coming close to filling up the pre-defined output area while the job is being processed by the accelerator. In exemplary embodiments, the input/output data mechanism does not require either the host or the accelerator to spin while waiting for the other to do something that the other has requested. In exemplary embodiments, the input/output data mechanism can also be used to assign and free pages from the input, creating a sliding window where only a portion of the input data must be locked in memory while the accelerator processes that input data.

Figure 1:
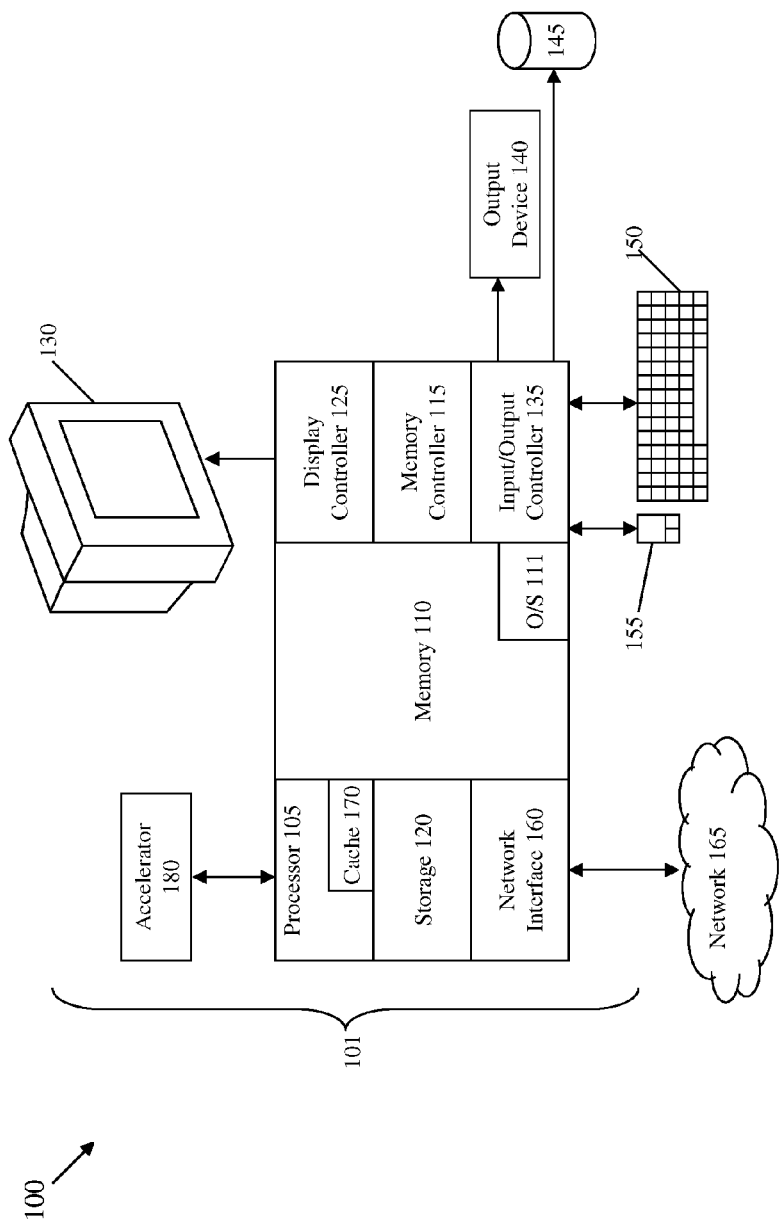
FIG. 1 depicts a block diagram of a computer system for practicing the teachings herein according to an embodiment.

Referring now to FIG. 1, a block diagram of an exemplary computer system 100 for use with the teachings herein is shown. The methods described herein can be implemented in hardware software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 1, the computer 101 includes a processor 105, memory 110 coupled via a memory controller 115, a storage device 120, and one or more input and/or output (I/O) devices 140, 145 (or peripherals) that are communicatively coupled via a local input/output controller 135. The input/output controller 135 can be, for example, but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The storage device 120 may include one or more hard disk drives (HDDs), solid state drives (SSDs), or any other suitable form of storage.

The processor 105 is a computing device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 may include a cache 170, which may be organized as a hierarchy of more cache levels (L1, L2, etc.).

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as Wi-Fi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the storage devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions. In exemplary embodiments, the computer system 100 includes one or more accelerators 180 that are configured to communicate with the processor 105. The accelerator 180 may be a field programmable gate array (FPGA) or other suitable device that is configured to perform specific processing tasks. In exemplary embodiments, the computer system 100 may be configured to offload certain processing tasks to an accelerator 180 because the accelerator 180 can perform the processing tasks more efficiently than the processor 105.

Figure 2:
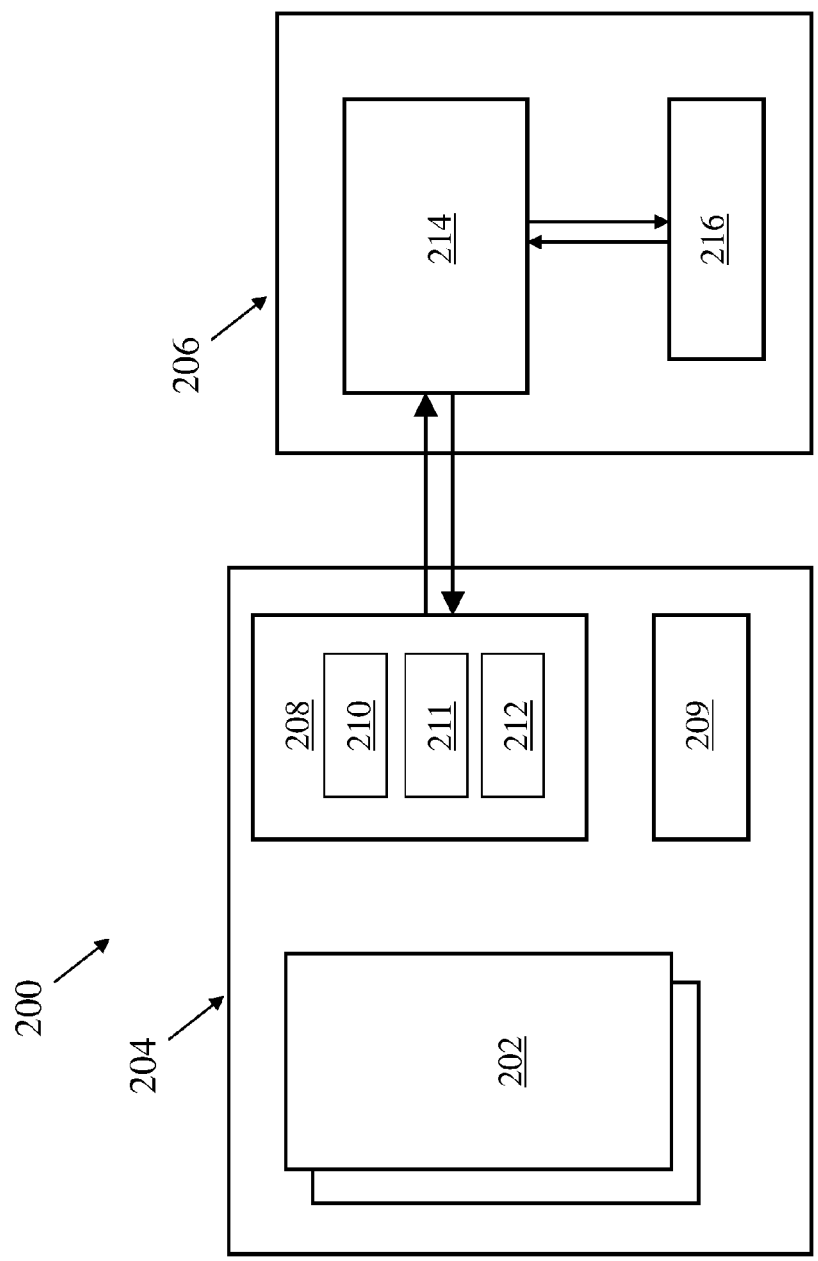
FIG. 2 depicts a block diagram of a system having an extendible input/output data mechanism for an accelerator in accordance with an exemplary embodiment.

Referring now to FIG. 2, a block diagram illustrating a system 200 having an accelerator 206 in accordance with an exemplary embodiment is shown. The system 200 includes a host 204, which may be a computer as shown in FIG. 1. In exemplary embodiments, the host 204 is executing one or more applications 202 and offloads one or more processing tasks from the applications 202 to the accelerator 206 by sending instructions to a driver 208 for the accelerator 206. In exemplary embodiments, the driver 208 includes a queue 210 for managing jobs to be sent to the accelerator 206 and a status indicator 212 for tracking the status of the accelerator 206. In exemplary embodiments, the driver 208 may also include an interrupt handler 211 that is configured to monitor the status indicator 212 and to cause an interrupt when value of the status indicator 212 is a predetermined value. In exemplary embodiments, the host 204 includes a memory 209 that is accessible by application 202 and the accelerator 206. The application 202 is configured to write data to that will be accessed by the accelerator 206 to the memory 209. Likewise, the accelerator 206 is configured to write data that will be accessed by the application 202 to the memory 209.

In exemplary embodiments, the application 202 creates a job control block for each job, or set of instructions, that it sends to the accelerator 206. The job control block includes an indication of the operations that the accelerator 206 is to perform, an identification of the locations in memory 209 of input data to be used by the accelerator 206, and an identification of the locations in memory 209 that the accelerator 206 should write output data to. In exemplary embodiments, the accelerator 206 includes a service layer 214 and application logic 216. The service layer 214 is configured to communicate with the driver 208 of the host 204 and the application logic 216 is configured to execute the instructions received from the host 204.

Although a single accelerator 206 is shown, it will be clear to one of ordinary skill in the art that the system 200 may include multiple accelerators 206, which can be arranged in the system 200 in a variety of configurations. For example, multiple accelerator chips may be located on a single accelerator card (e.g., PCIe card), a single accelerator chip may be located on each of multiple accelerator cards in the system, or a combination of the two arrangements can be used. In exemplary embodiments, the communication among different accelerators can be performed in a variety of ways based on the system configuration.

Figure 3:
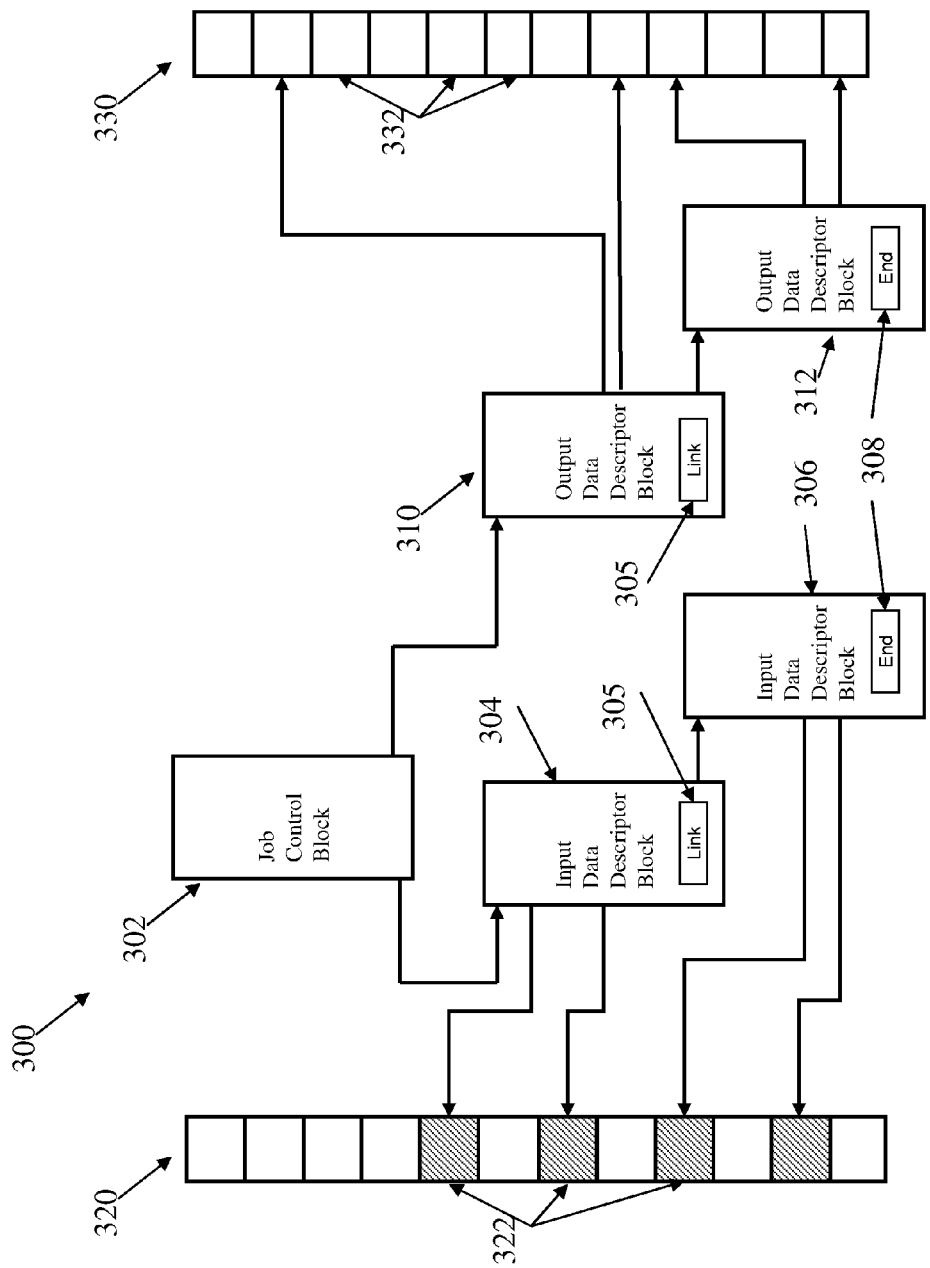
FIG. 3 depicts a block diagram of an initial job structure for an accelerator in accordance with an exemplary embodiment.

Referring now to FIG. 3, a block diagram of an initial job structure 300 for processing a job by an accelerator in accordance with an exemplary embodiment is shown. In exemplary embodiments, the job structure 300 includes a job control block 302 that is created by an application. In exemplary embodiments, the application creates a job control block 302 for each job, or set of instructions, that it sends to the accelerator. The job control block includes an indication of the operations that the accelerator is to perform and a pointer to a data descriptor block that provides the accelerator with memory locations for input and/or output data. In exemplary embodiments, the data descriptor block can include an input data descriptor block 304 and/or an output data descriptor block 310.

In exemplary embodiments, the input data descriptor block 304 includes pointers to one or more locations 322 in memory 320 which contain input data to be used by the accelerator. In addition, the input data descriptor block 304 includes a pointer 305 to a next input data descriptor block. In exemplary embodiments, the next input data descriptor block may be a last input data descriptor block 306, which includes pointers to one or more locations 322 in memory 320 that contain input data to be used by the accelerator. In addition, the last input data descriptor block 306 includes indicator 308 that it is the last input data descriptor block 306 of the job.

In exemplary embodiments, the output data descriptor block 310 includes pointers to one or more locations 332 in memory 330 which are used by the accelerator to write output data to. In addition, the output data descriptor block 310 includes a pointer 305 to a next output data descriptor block. In exemplary embodiments, the next output data descriptor block may be a last output data descriptor block 312, which includes pointers to one or more locations 332 in memory 330 that are used by the accelerator to write output data to. In addition, the last output data descriptor block 312 includes indicator 308 that it is the last output data descriptor block 312 of the job. In exemplary embodiments, the memory 320 and memory 330 reside in the memory of the host, as shown in FIG. 2.

Figure 4:
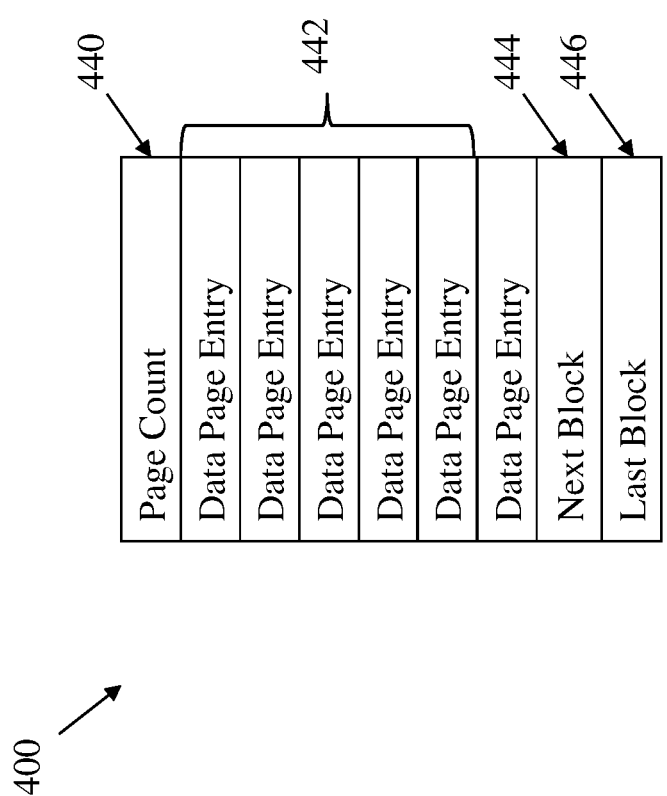
FIG. 4 depicts a block diagram of a data descriptor block in accordance with an exemplary embodiment.

Referring now to FIG. 4, a block diagram of a data descriptor block 400 in accordance with an exemplary embodiment is shown. The data descriptor block 400 may be either an input or output data descriptor block as shown in FIG. 3. In exemplary embodiments, each data descriptor block 400 is a fixed size block that includes a header 440, a plurality of data page entries 442 and a pointer 444 to the next data descriptor block. In exemplary embodiments, each of the data page entries 442 is an address and length of the next entry valid in the memory or an address and length of a last valid entry in the memory. In exemplary embodiments, the header 440 includes a total number of input or output address entries for the job. In one embodiment, when the pointer 444 to the next data descriptor block has a NULL value, the data descriptor block is the last data descriptor block of a job. In other embodiments, the data descriptor block 400 may include a separate last block indicator 446 used to indicate that the data descriptor block is the last data descriptor block of a job. In other embodiments, a single entry can be used to combine these two indicators along with, or instead of, a data page entry to utilize only one entry in the data descriptor block In exemplary embodiments, the job structure used for processing jobs by an accelerator is configured such that the amount of memory allocated for both input and output data can be modified during execution of the job by the accelerator. In exemplary embodiments, the amount of memory allocated can be extended by creating a new last data descriptor block and modifying the existing last data descriptor block of the job. For example, upon determining that the application would like to provide additional input data to the accelerator, the application may modify the existing last input data descriptor block to create a pointer to point to a new input data descriptor block that references additional memory locations. In exemplary embodiments, during execution of the job by the accelerator, the accelerator is configured to re-fetch the last data descriptor block after it completes processing the data referenced by the last data descriptor block to determine if a new data descriptor block has been added by the application during the processing of the current last data descriptor block.

In exemplary embodiments, the data descriptor blocks are fetched, or retrieved, by the accelerator on demand. That is, the accelerator retrieves the data descriptor blocks during execution of the job as they are needed. Accordingly, the number of pages of input data for a job being executed can be extended by modifying last block in chain of data descriptor blocks and replacing the last data descriptor block with a single entry with pointer to new chain of input data descriptor blocks.

Figure 5:
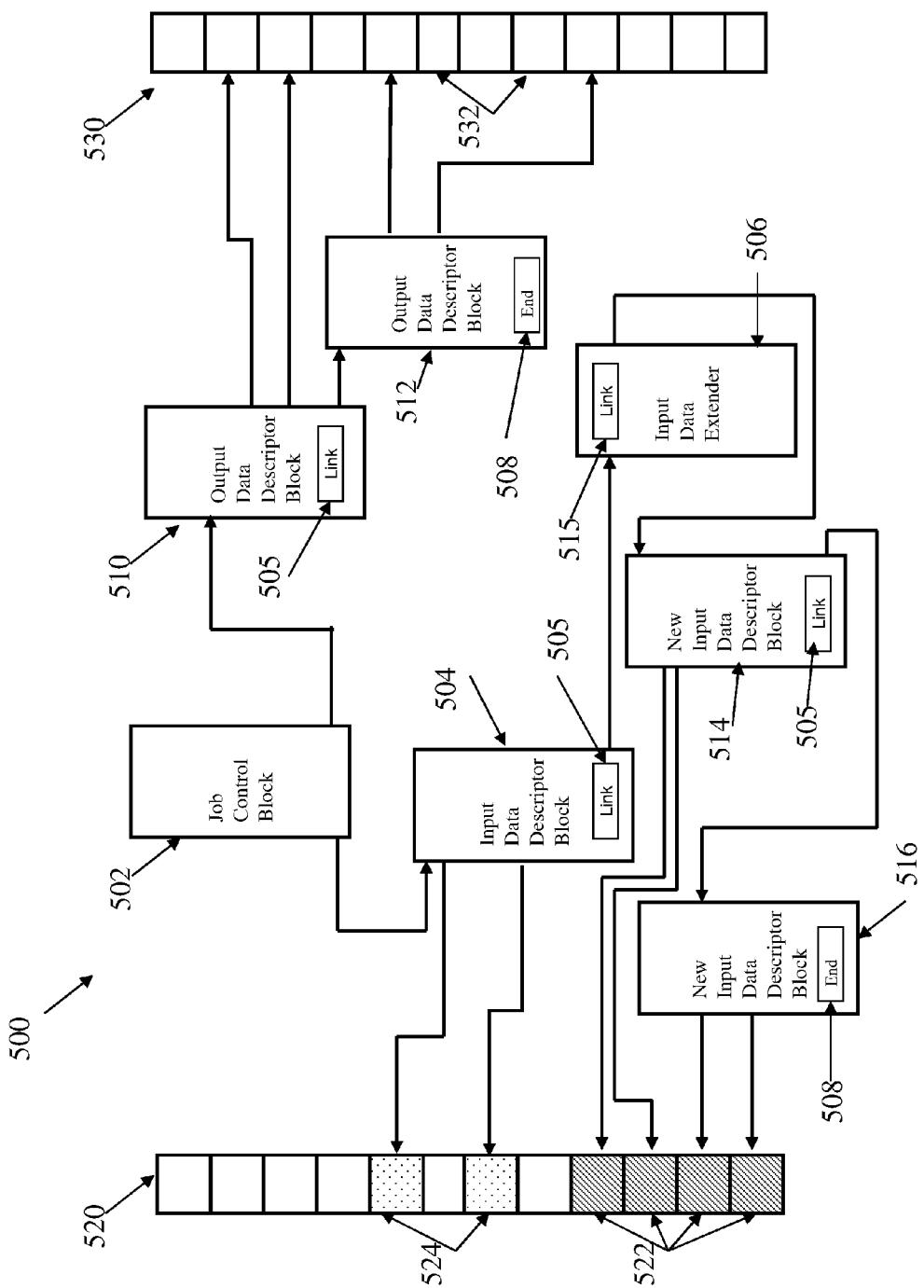
FIG. 5 depicts a block diagram of an extended job structure for an accelerator in accordance with an exemplary embodiment.

Referring now to FIG. 5, a block diagram of an extended job structure 500 for processing a job by an accelerator in accordance with an exemplary embodiment is shown. The extended job structure 500 is the job structure shown in FIG. 3 that has been extended to add an additional input data descriptor block 516 and 514. In exemplary embodiments, the job structure 500 includes a job control block 502 that is created by an application. In exemplary embodiments, the application creates a job control block 502 for each job, or set of instructions, that it sends to the accelerator. The job control block includes an indication of the operations that the accelerator is to perform, a pointer to an input data descriptor block 504, and a pointer to an output data descriptor block 510.

In exemplary embodiments, the input data descriptor block 504 includes pointers to one or more locations 524 in memory 520 which contain input data that has to be processed by the accelerator. In exemplary embodiments, the accelerator may report the number of input blocks that have been processed to host, which could free the memory locations 524 that have already been processed. In addition, the input data descriptor block 504 includes a pointer 505 to an input data extender block 506, which was the previous last data descriptor block that has been modified to extend the input memory available to the accelerator.

The input data extender block 506 includes a link 515 to input data descriptor block 514. In exemplary embodiments, the new input data descriptor block 514 includes pointers to one or more locations 522 in memory 520 which contain input data that may not have been processed by the accelerator. In addition, the new input data descriptor block 514 includes pointer 505 to the new input data descriptor block 516, which may be a last input data descriptor block. In exemplary embodiments, the new data descriptor block 516 includes pointers to one or more locations 522 in memory 520 which contain input data that have not been processed by the accelerator. In addition, if the new input data descriptor block 516 is a last data descriptor block it will include an indicator 508 that it is the last input data descriptor block of the job. Otherwise, if the new input data descriptor block 516 is not the last data descriptor block it will include a pointer to a next input data descriptor block.

In exemplary embodiments, the output data descriptor block 510 includes pointers to one or more locations 532 in memory 530 which are used by the accelerator to write output data to. In addition, the output data descriptor block 510 includes a pointer 505 to a next output data descriptor block. In exemplary embodiments, the next output data descriptor block may be a last output data descriptor block 512, which includes pointers to one or more locations 532 in memory 530 that are used by the accelerator to write output data to. In addition, the last output data descriptor block 512 includes indicator 508 that it is the last output data descriptor block 512 of the job. In exemplary embodiments, the memory 520 and memory 530 reside in the memory of the host, as shown in FIG. 2. It will be appreciated by those of ordinary skill in the art that the same techniques that were used to extend the input data space can be applied to the output data space to extend the area in memory available for output.

Figure 6:
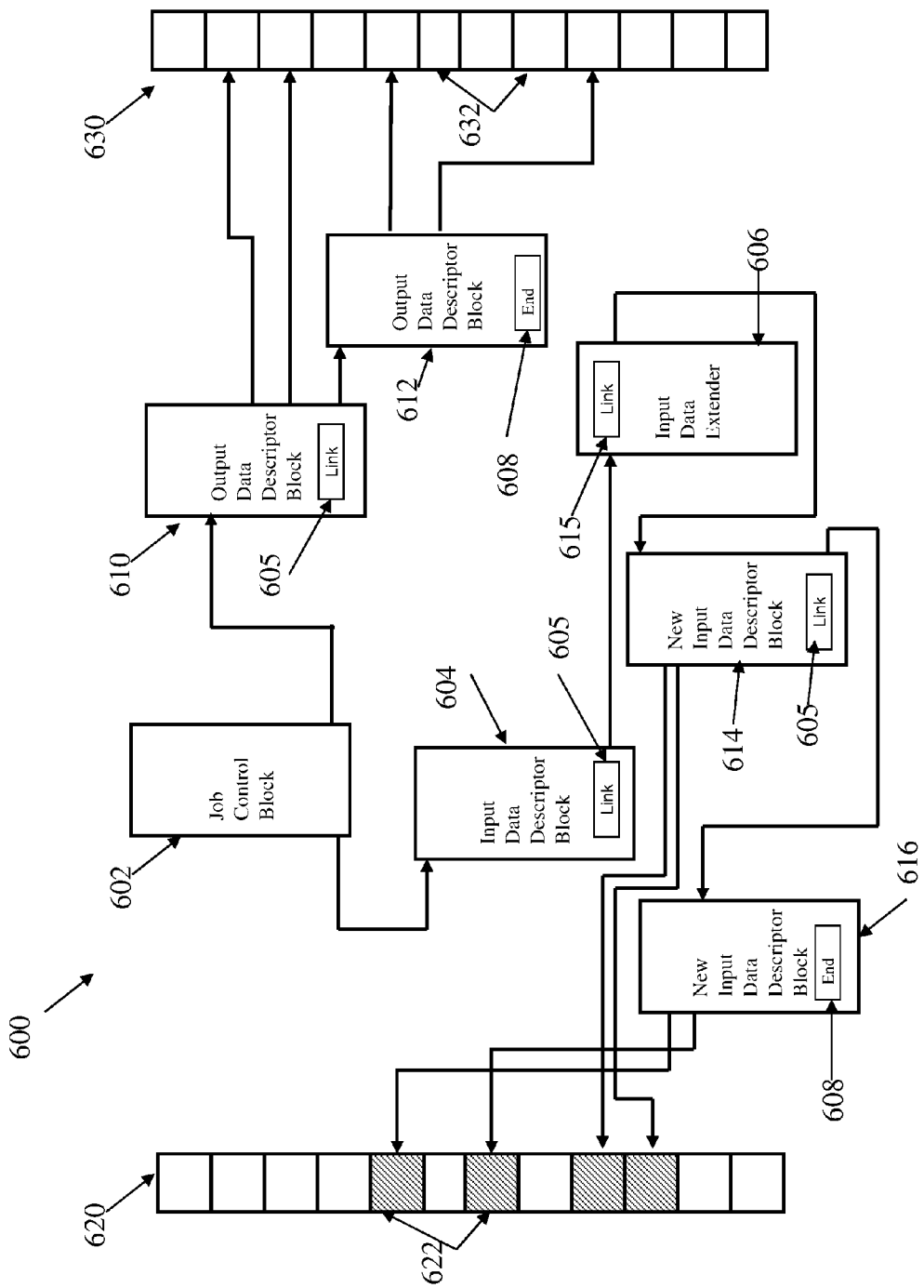
FIG. 6 depicts a block diagram of an extended job structure for an accelerator in accordance with an exemplary embodiment.

Referring now to FIG. 6, a block diagram of an extended job structure 600 for processing a job by an accelerator in accordance with an exemplary embodiment is shown. The extended job structure 600 is the job structure shown in FIG. 3 that has been extended to add additional input data descriptor blocks 616 and 614. In exemplary embodiments, the job structure 600 includes a job control block 602 that is created by an application. In exemplary embodiments, the application creates a job control block 602 for each job, or set of instructions, that it sends to the accelerator. The job control block includes an indication of the operations that the accelerator is to perform, a pointer to an input data descriptor block 604, and a pointer to an output data descriptor block 610.

In exemplary embodiments, the input data descriptor block 604 includes a pointer 605 to an input data extender block 606, which is a modification of the previous last data descriptor block and contains only a pointer to the new data descriptor block 614 to extend the input data and/or memory for the accelerator. The input data extender block 606 includes a link 615 to input data descriptor block 614. In exemplary embodiments, the input data descriptor block 614 includes pointers to one or more locations 622 in memory 620 which contain input data that may not have been processed by the accelerator. In addition, the input data descriptor block 614 includes pointer 605 to the new input data descriptor block 616, which may be a last input data descriptor block. The new data descriptor block 616 includes pointers to one or more locations 622 in memory 620 which contain input data that have not been processed by the accelerator. In exemplary embodiments, the one or more locations 622 in memory 620 may be locations that were previously used by the data descriptor block 604 and that were reused by the host. If the new input data descriptor block 616 is a last data descriptor block it will include an indicator 608 that it is the last input data descriptor block of the job. Otherwise, if the new input data descriptor block 616 is not the last data descriptor block it will include a pointer to a next input data descriptor block.

In exemplary embodiments, the output data descriptor block 610 includes pointers to one or more locations 632 in memory 630 which are used by the accelerator to write output data to. In addition, the output data descriptor block 610 includes a pointer 605 to a next output data descriptor block. In exemplary embodiments, the next output data descriptor block may be a last output data descriptor block 612, which includes pointers to one or more locations 632 in memory 630 that are used by the accelerator to write output data to. In addition, the last output data descriptor block 612 includes indicator 608 that it is the last output data descriptor block 612 of the job. In exemplary embodiments, the memory 620 and memory 630 reside in the memory of the host, as shown in FIG. 2. It will be appreciated by those of ordinary skill in the art that the same techniques that were used to extend the input data space can be applied to the output data space to extend the area in memory available for output.

In exemplary embodiments, the host is configured to create a window of input data that will advance as the job runs by releasing input data as it is processed by the accelerator and writing new data to the location previously occupied by the processed data. In order for the host to release input data, the accelerator is configured to report either a number of input pages processed in job completion data, or the location of the last input page processed.

Figure 7:
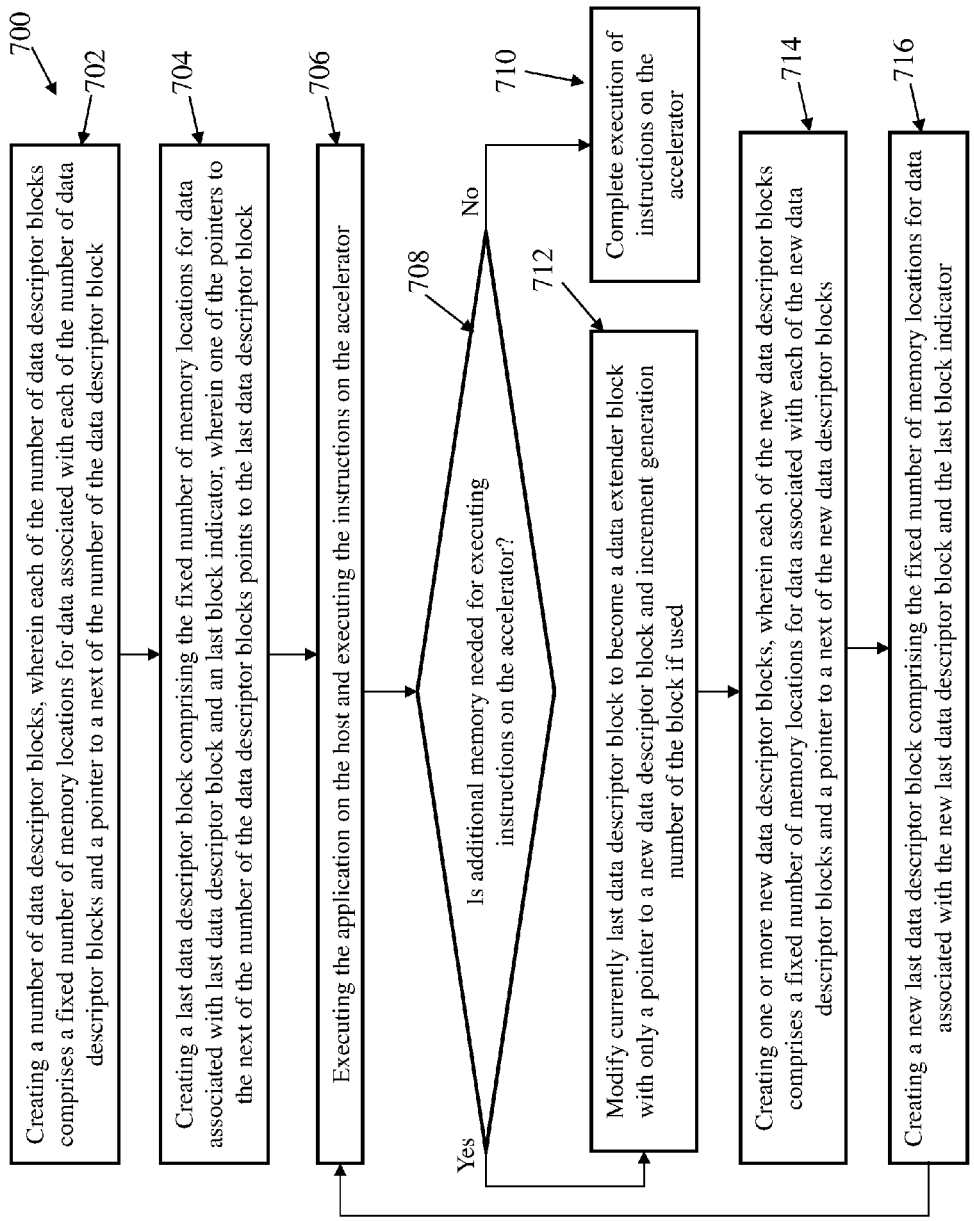
FIG. 7 depicts a flow diagram of a method for accelerating multiple query processing operations in accordance with an exemplary embodiment.

Referring now to FIG. 7, a flow diagram illustrating a method 700 for providing an extendable job structure for executing instructions on an accelerator according to an embodiment is shown. As shown at block 702, the method 700 includes creating a number of data descriptor blocks, wherein each of the number of data descriptor blocks comprises a fixed number of memory locations for data associated with each of the number of data descriptor blocks and a pointer to a next of the number of the data descriptor block. Next, as shown at block 704, the method 700 includes creating a last data descriptor block comprising the fixed number of memory locations for data associated with last data descriptor block and an last block indicator, wherein one of the pointers to the next of the number of the data descriptor blocks points to the last data descriptor block. As shown at decision block 706, the method 700 includes executing the application on the host and executing the instructions on the accelerator.

Continuing with reference to FIG. 7, as shown at decision block 708, the method 700 includes determining if additional data and/or memory are needed for the current job running on the accelerator. If additional data and/or memory is not needed for the current job running on the accelerator, the method proceeds to block 710 and execution of the job on the accelerator is completed. Otherwise, the method 700 proceeds to block 712 and modifies the current last data descriptor block to become a data extender block. In addition, a generation number of last data descriptor block may be incremented, if the last data descriptor block includes a generation number. In exemplary embodiments, the data extender block includes a pointer to the next data descriptor block which could be the last data descriptor block or a new intermediate data descriptor block. As shown at decision block 714, the method 700 also includes creating a number of new data descriptor blocks, wherein each of the number of data descriptor blocks has a fixed number of memory locations for data associated with each of the number of data descriptor blocks and a pointer to a next of the number of the new data descriptor blocks. Next, as shown at block 716, the method 700 includes creating the new last data descriptor block comprising the fixed number of memory locations for data associated with last data descriptor block and the last block indicator.

In exemplary embodiments, the job structure can be used to add additional output data descriptor blocks when the accelerator needs additional memory locations to write output data to. In one embodiment, as shown in FIG. 2, the accelerator status indicator 212 on the host 204 is configured to track the status of the accelerator 206. The accelerator status indicator 212 may be a fixed number of bits that are used for indicating an attention condition. For example, the accelerator status indicator 212 can be used to request additional memory for output data where each new request for additional memory will use a separate bit. In exemplary embodiments, when the accelerator 206 reaches a trigger condition the accelerator status indicator 212 will be updated by the accelerator 206. In one embodiment, the trigger condition could be a number of output pages remaining to be used by the accelerator 206 falling below a threshold value. In another embodiment, the trigger condition may be a percentage of the total assigned output pages that have been used by the accelerator 206 exceeding a threshold value.

In one embodiment, an interrupt may be caused on the host 204 when the accelerator 206 updates the accelerator status indicator 212. In response to the interrupt, the interrupt handler 211 will call an exit to the application 202 registered with the interrupt handler 211. The application 202 will then update the job structure to extend the amount of memory 209 available to the accelerator 206 for output data. In one embodiment, the application 202 may modify the last data descriptor block to create a data extender that points to a list extension and updates the total page count. In exemplary embodiments, the application 202 can build a list extending the output space on demand or can have a pre-built list that can be appended.

In one embodiment, if the application 202 updates the data output descriptor blocks in response to a change in the accelerator status indicator 212, the accelerator 206 may never process the original last output data descriptor and will continue processing normally. In another embodiment, when the accelerator 206 processes the last output data descriptor it may execute the last data descriptor but it may not treat it as the end of list unless a flag in data descriptor end entry indicates that the data descriptor was intended to be the end of the list. Otherwise, after the accelerator 206 processes the last output data descriptor, the accelerator 206 will re-fetch the last data descriptor block. If the first entry in the re-fetched data descriptor block is a pointer entry, the list has been extended and the accelerator 206 will fetch new data descriptor block indicated by the pointer entry. Otherwise, the job will be completed with a status of incomplete. In exemplary embodiments, if data output pages can be correlated to input pages processed, the accelerator may return indication of last input page processed when a job is completed with an incomplete status due to insufficient output space allowing the application 202 to build a new job to complete the processing of the remaining input data.

Figure 8A:
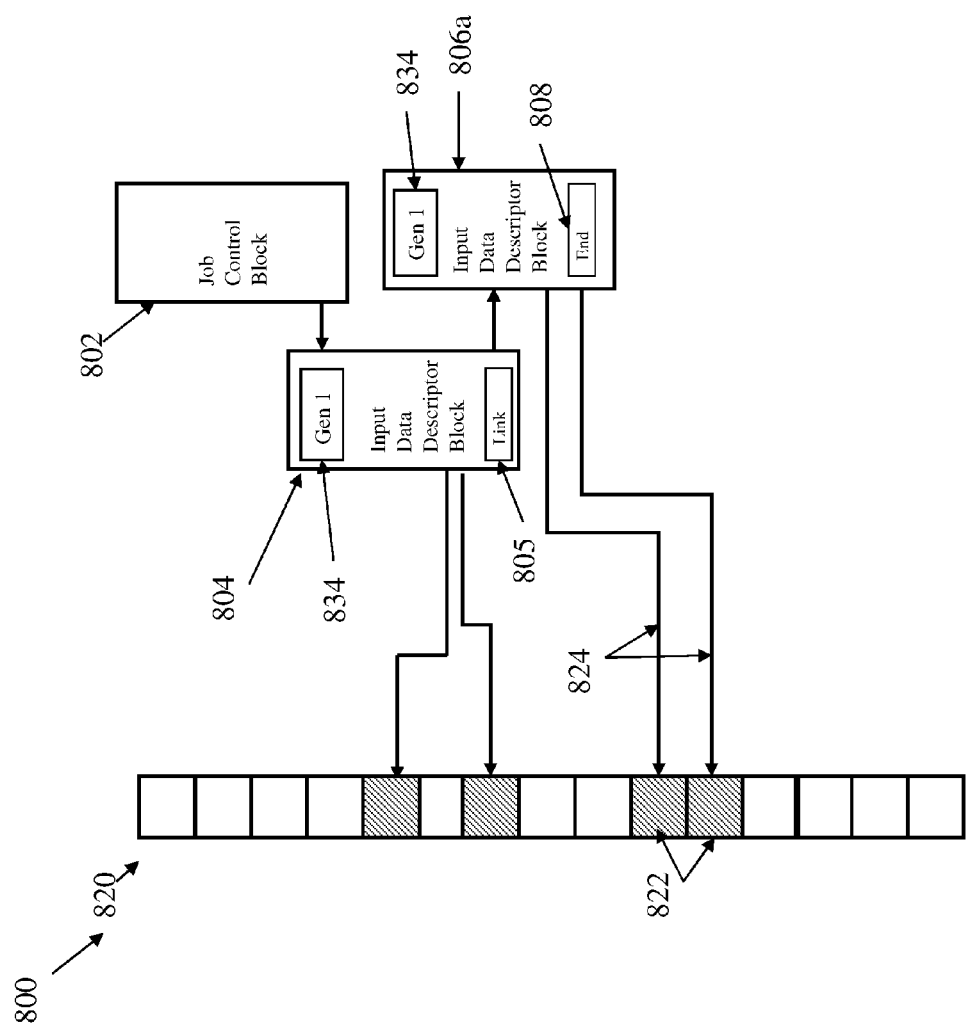
FIG. 8A depicts a block diagram an initial job structure for an accelerator in accordance with an exemplary embodiment.
Figure 8B:
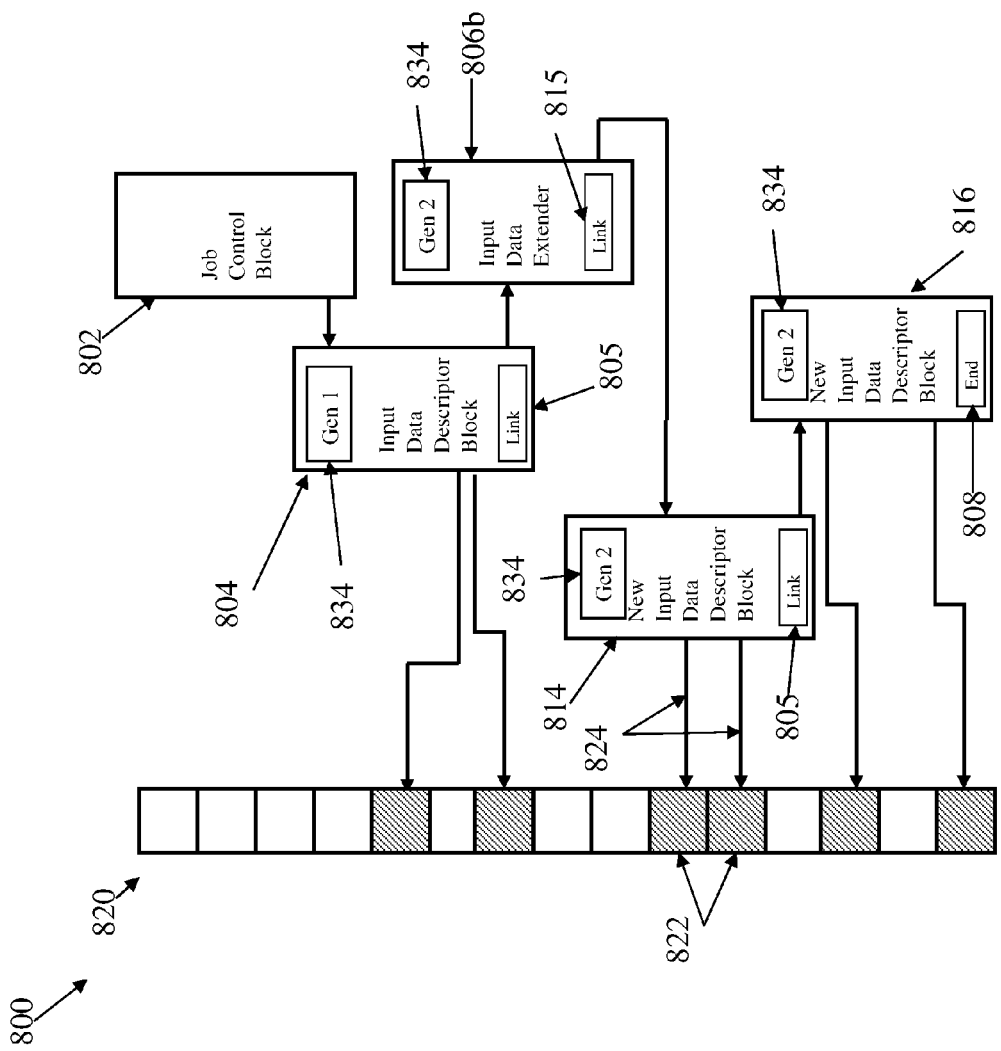
FIG. 8B depicts a block diagram of an extended job structure for an accelerator in accordance with an exemplary embodiment.

Referring now to FIGS. 8A and 8B, FIG. 8A illustrates a block diagram of job structure 800 for processing a job by an accelerator before being extended and FIG. 8B illustrates the job structure 800 for processing a job by an accelerator after being extended. In exemplary embodiments, every extension of the chain of data descriptor blocks copies data pointers 824 to memory locations 822 from the last block 806a to the first block 814 of the extension and increments a generation number 834 of prior last block 806a and all new blocks 816 in the extension. In addition, a data extender 806b having a link 815 replaces the prior last block 806a to extend the chain of data descriptor blocks.

In exemplary embodiments, when the last block 806a in a chain is updated before it is fetched by accelerator, the pointers 824 to data in prior last block 806a are replicated to first block 814 in the extension of the chain. In exemplary embodiments, when the last block 806a in chain is fetched by accelerator prior to being extended the accelerator will re-fetch last block 806a after it completes processing the last block 806a. By re-fetching the last block 806a, the accelerator can determine if the generation number 834 of the last block 806a has changed, which indicates an extension has occurred. Accordingly, in this case a first block 814 in extension of the chain may be skipped since data 822 pointed to by pointers 824 were processed before the last block 806a was re-fetched. In exemplary embodiments, the generation number is configured to track the number of times the extendable job structure, which includes the chain of data descriptor blocks, has been extended and every extension of the chain has will have different generation number. The use of generation numbers 834 is configured to insure that no input data space is lost by re-fetching mechanism.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for providing an extendable job structure for executing instructions on an accelerator, the method comprising:
   creating, with a processing device, a number of data descriptor blocks, wherein each of the number of data descriptor blocks comprises a fixed number of memory location addresses for data associated with each of the number of data descriptor blocks and a pointer to a next of the number of the data descriptor block;
   creating a last data descriptor block comprising the fixed number of memory location addresses for data associated with last data descriptor block and an last block indicator, wherein one of the pointers to the next of the number of the data descriptor blocks points to the last data descriptor block;
   based on determining that additional memory is required for executing instructions on the accelerator:
      modifying the last data descriptor block to become a data extender block comprising a pointer to one of one or more new data descriptor blocks, each of the one or more new data descriptor blocks comprises the fixed number of memory location addresses for data; and
      creating a new last data descriptor block comprising the fixed number of memory locations for data associated with the new last data descriptor block and the last block indicator.

2. The method of claim 1, wherein the data descriptor blocks are input data descriptor blocks and the data associated with the data descriptor blocks is input data to be processed by the accelerator.

3. The method of claim 1, wherein the data descriptor blocks are output data descriptor blocks and the data associated with the data descriptor blocks is output data generated by the accelerator.

4. The method of claim 1, further comprising:
   based on determining that additional memory is required for executing instructions on the accelerator, creating a number of new data descriptor blocks, wherein each of the number of new data descriptor blocks comprises the fixed number of memory locations for data associated with each of the number of new data descriptor blocks and a pointer to a next of the number of the new data descriptor blocks.

5. The method of claim 4, wherein one of the pointers to the next of the number of the new data descriptor blocks points to the new last data descriptor block.

6. The method of claim 4, wherein each of the number of data descriptor blocks, the last data descriptor block, the data extender block, the number of new data descriptor blocks and the new last data descriptor block include a generation number.

7. The method of claim 6, wherein the generation number is configured to track the number of times the extendable job structure has been extended.

8. A system comprising a processing device configured to:
create a number of data descriptor blocks, wherein each of the number of data descriptor blocks comprises a fixed number of memory location addresses for data associated with each of the number of data descriptor blocks and a pointer to a next of the number of the data descriptor block;
create a last data descriptor block comprising the fixed number of memory location addresses for data associated with last data descriptor block and an last block indicator, wherein one of the pointers to the next of the number of the data descriptor blocks points to the last data descriptor block;
based on determining that additional memory is required for executing instructions on the accelerator to:
replace the last data descriptor block with an extender block comprising a pointer to one of one or more new data descriptor blocks, wherein each of the one or more new data descriptor blocks comprises the fixed number of memory location addresses for data; and
create a new last data descriptor block comprising the fixed number of memory locations for data associated with the new last data descriptor block and the last block indicator.

9. The system of claim 8, wherein the data descriptor blocks are input data descriptor blocks and the data associated with the data descriptor blocks is input data to be processed by the accelerator.

10. The system of claim 8, wherein the data descriptor blocks are output data descriptor blocks and the data associated with the data descriptor blocks is output data generated by the accelerator.

11. The system of claim 8, further comprising:
based on determining that additional memory is required for executing instructions on the accelerator, creating a number of new data descriptor blocks, wherein each of the number of new data descriptor blocks comprises the fixed number of memory locations for data associated with each of the number of new data descriptor blocks and a pointer to a next of the number of the new data descriptor blocks.

12. The system of claim 11, wherein a new data extender block replaces the last data descriptor block and contains a pointer to the next of the number of the new data descriptor blocks points to the new last data descriptor block.

13. The system of claim 11, wherein each of the number of data descriptor blocks, the last data descriptor block, the data extender block, the number of new data descriptor blocks and the new last data descriptor block include a generation number.

14. The system of claim 13, wherein the generation number is configured to track a number of times the extendable job structure has been extended.

15. A computer program product, comprising:
a non-transitory computer readable storage medium having computer readable program code stored thereon that, when executed, performs a method, the method comprising:
creating a number of data descriptor blocks, wherein each of the number of data descriptor blocks comprises a fixed number of memory location addresses for data associated with each of the number of data descriptor blocks and a pointer to a next of the number of the data descriptor block;
creating a last data descriptor block comprising the fixed number of memory location addresses for data associated with last data descriptor block and a last block indicator, wherein one of the pointers to the next of the number of the data descriptor blocks points to the last data descriptor block;
based on determining that additional memory is required for executing instructions on the accelerator:
modifying the last data descriptor block to become a data extender block comprising a pointer to one of one or more new data descriptor blocks, each of the one or more new data descriptor blocks comprises the fixed number of memory location addresses for data; and
creating a new last data descriptor block comprising the fixed number of memory locations for data associated with the new last data descriptor block and the last block indicator.

16. The computer program product of claim 1, wherein the data descriptor blocks are input data descriptor blocks and the data associated with the data descriptor blocks is input data to be processed by the accelerator.

17. The computer program product of claim 1, wherein the data descriptor blocks are output data descriptor blocks and the data associated with the data descriptor blocks is output data generated by the accelerator.

18. The computer program product of claim 1, further comprising:
based on determining that additional memory is required for executing instructions on the accelerator, creating a number of new data descriptor blocks, wherein each of the number of new data descriptor blocks comprises the fixed number of memory locations for data associated with each of the number of new data descriptor blocks and a pointer to a next of the number of the new data descriptor blocks.

19. The computer program product of claim 18, wherein one of the pointers to the next of the number of the new data descriptor blocks points to the new last data descriptor block.

20. The computer program product of claim 18, wherein each of the number of data descriptor blocks, the last data descriptor block, the data extender block, the number of new data descriptor blocks and the new last data descriptor block include a generation number.

* * * * *